US006603580B1

(12) United States Patent
Taillie (10) Patent No.: US 6,603,580 B1
(45) Date of Patent: Aug. 5, 2003

(54) SCANNER HAVING A VARIABLE OBJECT PLANE

(75) Inventor: Joseph P. Taillie, Pittsford, NY (US)

(73) Assignee: Xerox Corporation, Stamford, CT (US)

( * ) Notice: Subject to any disclaimer, the term of this patent is extended or adjusted under 35 U.S.C. 154(b) by 0 days.

(21) Appl. No.: 09/459,309

(22) Filed: Dec. 10, 1999

(51) Int. Cl.[7] .......................... H04N 1/04; G03G 15/30; G03G 15/00; G03B 27/32
(52) U.S. Cl. .................. 358/474; 358/497; 399/362; 399/379; 399/380; 399/211; 355/25; 355/223
(58) Field of Search .................. 399/362, 379, 399/380, 211; 355/25, 223; 358/474, 497

(56) References Cited

U.S. PATENT DOCUMENTS

| | | | | |
|---|---|---|---|---|
| 4,980,720 A | * | 12/1990 | Siegel | 399/52 |
| 5,276,530 A | * | 1/1994 | Siegel | 358/406 |
| 5,726,775 A | * | 3/1998 | Walsh | 358/488 |
| 6,104,497 A | * | 8/2000 | Cohen et al. | 358/1.13 |

* cited by examiner

Primary Examiner—Edward Coles
Assistant Examiner—Houshang Safaipour
(74) Attorney, Agent, or Firm—John M. Kelly; Joseph M. Young (57) ABSTRACT

An input scanner for scanning three-dimensional objects, such as books, on a platen. The input scanner includes a light source for illuminating a three-dimensional object, an elongated sensor array for producing a digital representation of the image on the three-dimensional object, a lens array, a moving mirror, and a mirror positioning system, which beneficially includes a mirror motor. The mirror positioning system positions the mirror such that the input scanner's object plane tracks the contour of the three-dimensional object on the platen. Object plane adjustments are performed in response to contour information from a mechanical track guide, from a profile memory, or from a height sensor. Additionally, the input scanner might use a movable lens array, which is beneficially a gradient-index lens array.

18 Claims, 9 Drawing Sheets

SCANNER HAVING A VARIABLE OBJECT PLANE

FIELD OF THE INVENTION

This invention relates to scanning nonplanar originals, such as bound books or other three dimensional objects.

BACKGROUND OF THE INVENTION

Input scanners are widely used for producing digital versions of images on substrates. Digital versions are beneficial because they can be stored, processed, transmitted, and subsequently used by other devices, such as computers, copiers, and facsimile machines.

Input scanners usually include a flat, transparent platen that supports a substrate having an image that is to be digitized, and a moving raster scanner having a light source that radiates a narrow "strip" of light through the platen and onto the substrate. Part of that light is reflected by the image on the substrate and collected and focused by the raster scanner's input optics onto an elongated light sensor array. The light sensor then converts its received light into digital signals that are then stored. As the raster scanner moves across the substrate the light sweeps over the substrate and other light strips are digitized. When the substrate's image has been completely scanned the digital signals of all of the scan lines represent a digital image.

Scanning three-dimensional (non-planar) substrates such as bound books presents problems. One set of problems relates to defocusing of the image as the raster scanner moves. For example, when scanning a book the book's pages near the binding tends to become defocused as the pages lift off the platen. This is a particularly acute problem when the input optical system uses gradient index lens arrays. This is because while gradient index lenses are radiometrically efficient, they tend to have a limited depth-of-focus. Outside of the focus range the image is so distorted that it produces a seriously degraded reproduction. For example, some input scanners that use gradient index lens arrays can become significantly defocused by a separation of as little as 1 millimeter.

Various approaches have been used in the prior art to reduce the problems related to scanning three-dimensional objects. With books, one approach is to use "brute force" to press the book against the platen, thereby reducing the book's lift. However, portions of the book's pages still remain above the platen's surface. Moreover, pressing a book against a flat platen can degrade the book's binding, especially with older books. Another approach is to use a wedged platen to reduce binding degradation. However, wedged platens tend to reduce overall machine utility and increase cost.

Other approaches are described in U.S. Pat. No. 4,980,720, which issued on Dec. 25, 1990, and which is entitled, "Document Reproduction Machine with Enhanced Book Copying Capability," and in U.S. Pat. No. 5,276,530, which issued on Jan. 4, 1994, and which is entitled "Document reproduction machine with electronically enhanced book copying capability." Those patents discuss reproduction machines having a height sensor that determines the distance between a reference point (which may be in the object plane) and an original being scanned. The height information is used to control the position of a scanning mirror that adjusts the focus, illumination, and scan rate. Furthermore, those patents teach using information from a height sensor as an input to an electronic correction circuit that electronically corrects for defocusing caused by height variations. However, those patents discussed adjusting a moving scanning mirror to correct for defocusing. Furthermore, that scanning mirror was only optically coupled to a stationary single lens. Finally, those patents do not involve digitizing an image being scanned, but rather they simply imaged onto a photoreceptor. Therefore, those patents could make use of a relatively long optical path length to assist in focusing. However, with the advent of digital scanners, elements such as gradient index lens arrays, elongated sensor arrays, short optical path lengths, and mirrors disposed between gradient index lens arrays and elongated sensor arrays became common. Therefore, a new approach to copying three-dimensional objects on a flat platen would be beneficial.

SUMMARY OF THE INVENTION

The principles of the present invention provide for improved scanning of a three-dimensional object placed on a platen. An input scanner according to the principles of the present invention includes a platen that supports a three-dimensional object that is to be scanned, a raster scanner that produces a digital representation of the image on that object, and a mechanism that moves the raster scanner across the platen. The raster scanner includes a moving carriage, a light source on the moving carriage, an elongated sensor array, an optical system, and a positioning system. The light source emits a narrow line of light through the platen. The optical system, which includes a mirror and at least one lens array, focuses light from an object plane onto the elongated sensor array. The elongated sensor array then produces a digital representation of a line image in the object plane. The positioning system adjusts the object distance as the raster scanner moves across the platen such that the object plane tracks the contour of the three-dimensional object on the platen.

Object plane adjustments are performed by moving the mirror. A lens array might also be moved. The positioning system follows a contour matching system, which may be a mechanical track guide, a profile memory, or a height sensor.

BRIEF DESCRIPTION OF THE DRAWINGS

Other aspects of the present invention will become apparent as the following description proceeds and upon reference to.

DETAILED DESCRIPTION OF A PREFERRED EMBODIMENT OF THE INVENTION

Figure 1:
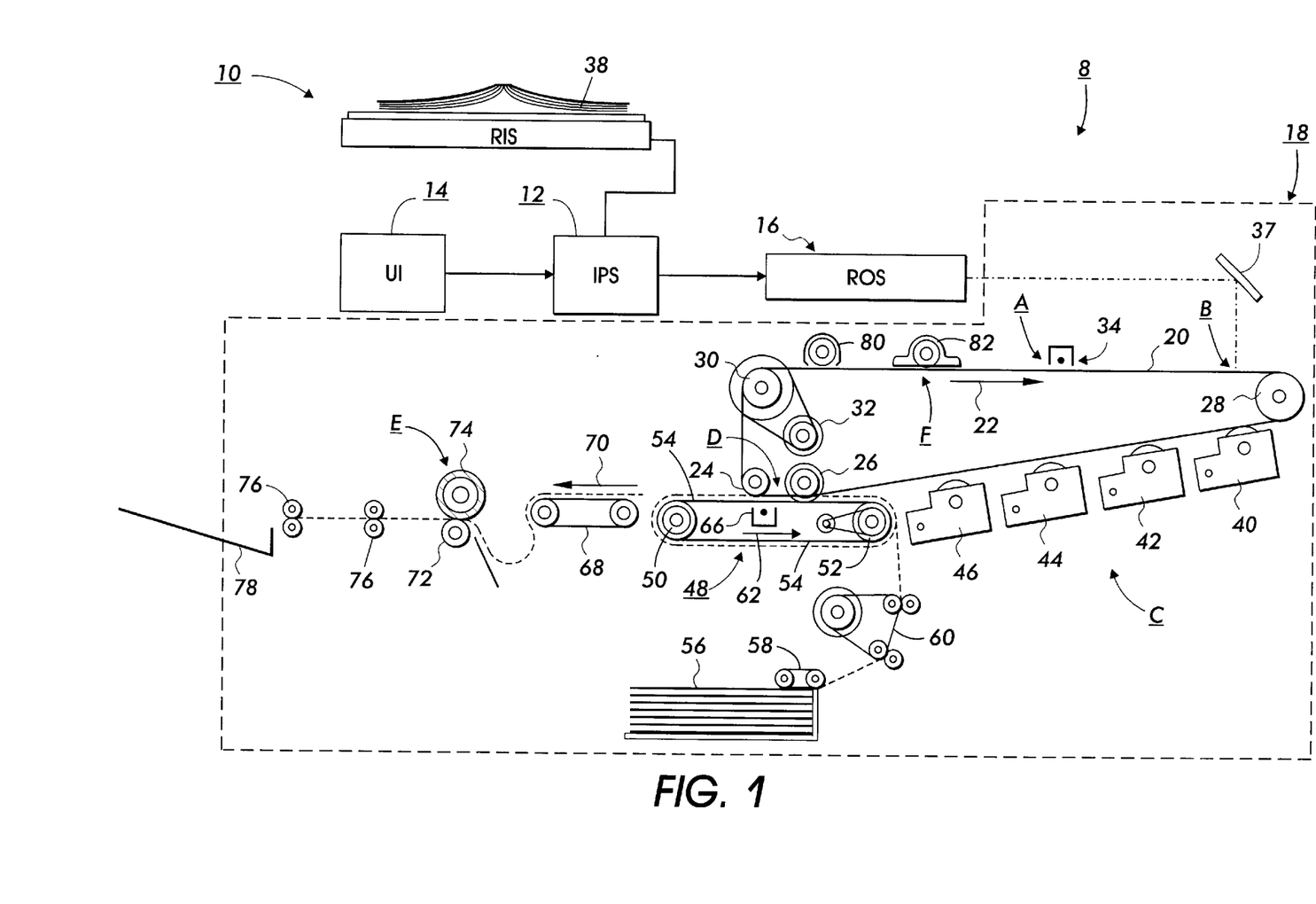
FIG. 1, which schematically illustrates an electrophotographic printing machine that incorporates the principles of the present invention.

Referring now to FIG. 1, a preferred embodiment of the present invention is incorporated in a digital, full color, electrophotographic copier 8 that is capable of copying three-dimensional objects. It will become evident from the following discussion that the principles of the present invention are well suited for use in other systems, specifically including stand-alone input scanners and facsimile machines. Therefore, the present invention is not limited to the copier 8.

To initiate copying a multicolor, three-dimensional object 38 is placed on an input scanner that is indicated generally by the reference numeral 10. The input scanner 10 converts the image on the object 38 into a series of raster scan lines comprised of sets of primary color signals, such as red, green and blue. While the three-dimensional object is shown as a book, other three-dimensional objects are also contemplated. The input scanner 10 includes a platen, illumination lamps, a gradient index lens optical system, an elongated sensor array (beneficially a photodiode array), and a tracking mechanism that adjusts the focus of the gradient index lens optical system so as to track the contour of the three-dimensional object 38. As the principles of the present invention are closely related to the input scanner, that scanner is described in more detail subsequently.

The sets of primary color signals are transmitted as electrical signals to an image processing system (IPS) 12, which converts those sets into sets of colorimetric coordinates that are more suitable for printing. Basically, the primary color densities are derived from additive colors (red, green and blue) while electrophotographic printing is usually performed using subtractive colors (cyan, magenta, and yellow) and black. The image processing system also contains control electronics for preparing and managing the image data flow to a raster output scanner (ROS) 16 that includes a laser source and an optical system.

A user interface (UI) 14 provides a method for an operator to communicate with the image processing system 12. The user interface 14 enables an operator to actuate appropriate input keys to implement operator adjustable copy parameters. In particular, an operator could select a special "book mode" feature to set up the copier 8 to perform book copying. The user interface 14 may be a touch screen, push buttons, or any other suitable input device. The output signals from the user interface 14 are transmitted to the image processing system 12, which can then cause the special "book mode" feature to be activated. The image processing system then transmits the electrical signals that correspond to the desired image to the raster output scanner 16. Those electrical signals are comprised of four sub-images, one that represents the black component of the desired image, another that represents the cyan component, another that represents the magenta component, and another that represents the yellow component. In response, the raster output scanner 16 scans and modulates its laser beam according to those components.

The copier 8 also includes an electrophotographic printer 18. The printer 18 includes a photoconductive belt 20 that is entrained about transfer rollers 24 and 26, a tensioning roller 28, and a drive roller 30. The drive roller 30 is rotated by a motor (or other suitable mechanism that is not shown) via a belt drive 32. As the drive roller 30 rotates, it advances the photoconductive belt 20 in the direction 22 to sequentially advance successive portions of the photoconductive belt 20 through the various processing stations disposed about that belt.

Initially, the photoconductive belt 20 sequentially passes through a charging station, indicated generally by the reference letter A. At the charging station A, a corona generator 34 generates ions via corona discharge that charge the photoconductive belt 20 to a relatively high, substantially uniform voltage potential.

Next, the charged photoconductive belt sequentially advances past an exposure station, indicated generally by the reference letter B. The exposure station B receives a modulated laser beam from the raster output scanner 16. The modulated laser beam is a sweeping beam that exposes, via a mirror 37, the photoconductive belt 20 so as to record four separate color latent images. A black latent image represents the black component of the desired image, a cyan latent image represents the cyan component, a magenta latent image represents the magenta component, and a yellow latent image represents the yellow component.

After an electrostatic latent image has been recorded on the photoconductive belt 20, that latent image is advanced toward a development station, indicated generally by the reference letter C. The development station C includes four individual developer units indicated by reference numerals 40, 42, 44 and 46. The developer units are of a type generally referred to in the art as "magnetic brush developers." A magnetic brush developer employs a magnetizable developer material including magnetic carrier granules that have triboelectrically adhering toner particles. The toner is continually brought through a directional flux field to form a toner brush. Development is achieved by bringing the brush of developer material into contact with the latent image bearing surface of the photoconductive belt. The developer 46 deposits black toner onto the black latent image, the developer 44 deposits cyan toner onto the cyan latent image, the developer 42 deposits magenta toner onto the magenta latent image, and the developer 40 deposits yellow toner onto the yellow latent image. Great care is taken to ensure that only toner particles of the correct color are deposited on the appropriate latent images.

Alter development, the toner images are moved to a transfer station, indicated generally by the reference letter D. Transfer station D includes a transfer zone, defining the position at which the toner image is transferred onto a substrate, such as a sheet of paper. A substrate transport, indicated generally by the reference numeral 48, moves the substrate into contact with photoconductive belt 20. The substrate transport 48 has a belt 54 entrained about a pair of substantially cylindrical rollers 50 and 52. A friction retard feeder 58 advances the uppermost substrate from a stack 56 onto a pre-transfer transport 60. The pre-transfer transport synchronizes the advancement of a substrate onto the substrate transport such that the leading edge of the substrate arrives at the transfer zone such that black toner image is properly positioned adjacent the substrate.

In the transfer zone a corona generating device 66 sprays ions onto the backside of the substrate so as to charge the substrate to the proper magnitude and polarity for attracting the toner from the photoconductive belt 20 onto the substrate. After the black toner is transferred onto the substrate the substrate remains electrostatically secured to the belt 54 so as to move in a recirculating path in the direction 62 for three more cycles. The three remaining toner images are then transferred onto the substrate in superimposed registration with one another.

After all of the toner images are transferred onto the substrate the substrate is removed from the substrate transport system by a vacuum conveyor, indicated generally by the reference numeral 68. The vacuum conveyor advances the substrate in the direction 70 into a fusing station, indicated generally by the reference letter E. In the fusing station a heated fuser roll 74 and a pressure roll 72 permanently fuse the composite toner layer with the substrate. The substrate is advanced by rolls 76 into a catch tray 78 for subsequent removal by an operator.

After the toner images are transferred onto the substrate, the photoreceptor belt advances in the direction 22 into a cleaning station, indicated generally by the reference letter F. There, a lamp 80 illuminates the surface of the photoconductive belt 20 to remove any residual charge. Thereafter, a rotating fibrous brush 82 removes any residual toner particles, dust, and/or debris from the photoconductive belt in preparation for the start of the next printing cycle.

In addition to the elements described above, the copier 8 also includes a system controller that controls the overall operation of the copier, drive components, power supplies, and other subsystems so as to implement the copying and printing schemes described above.

Figure 2:
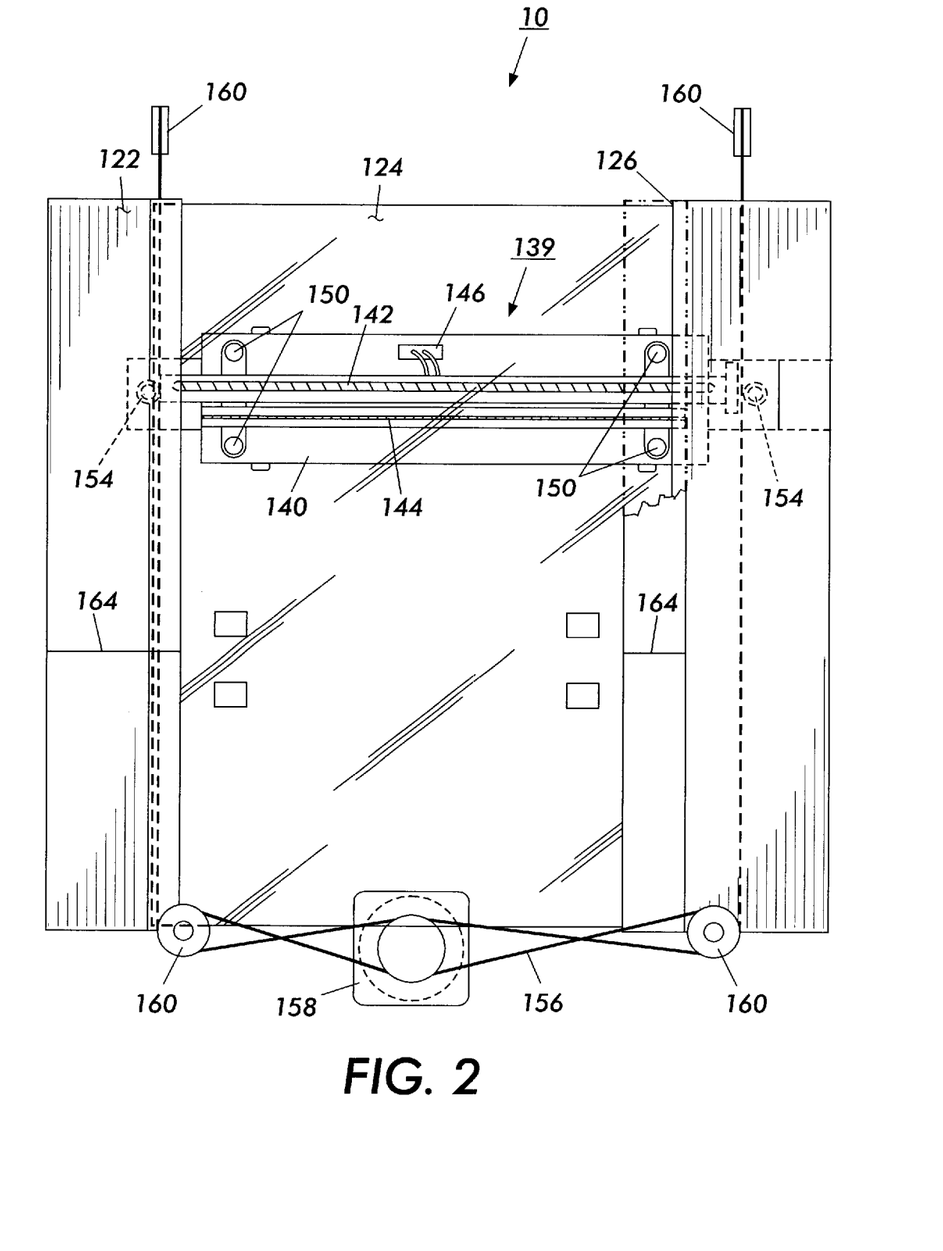
FIG. 2, which presents a top-down view of an input scanner used in the printing machine illustrated in FIG. 1.

As previously mentioned, the principles of the present invention are closely associated with the input scanner 10. FIG. 2 shows portions of the input scanner in more detail. The input scanner is comprised of a frame 122 onto which is firmly mounted a glass platen 124. The frame includes a document registration edge 126 that acts as a guide for locating flat documents. In practice the frame is beneficially made of either sheet metal or molded plastic. Below the platen 124 is a raster scanner 139 having a moving carriage assembly 140. In the moving carriage assembly is an elongated lamp 142 that is housed in a frame with a narrow opening through which light illuminates objects on the platen. The frame further includes registration marks 164. Those marks are used by an operator to locate a three-dimensional object that is to be scanned, such as a book, on the platen 124.

The raster scanner 139 also includes a harness assembly 146 for supplying electrical power to the lamp 142 and to a photodetector assembly 144, which is discussed in more detail subsequently. The harness assembly 146 is flexible and is located such that it does interfere with the motion of the moving carriage assembly. Beneficially, the interior of the frame that holds the lamp is made of a light reflective material. Furthermore the photodetector assembly is beneficially substantially enclosed within a metallic shield so as to reduce electromagnetic interference.

The raster scanner includes buttons 150 that contact the bottom of the platen 124. While the raster scanner 139 uses four buttons, in practice three buttons (two buttons on one side of the moving carriage assembly and one button on the other side) is preferred in some applications. The tops of the buttons are located above the remainder of the raster scanner. The raster scanner is attached at each end by fasteners 154 to a moving cable 156 that is driven via a motor 158 over pulleys 160 such that the raster scanner moves back and forth across the platen. Since the raster scanner is biased upward (in a manner that is not shown) the raster scanner 139 slides on its buttons 150 across the bottom of the platen.

Figure 3:
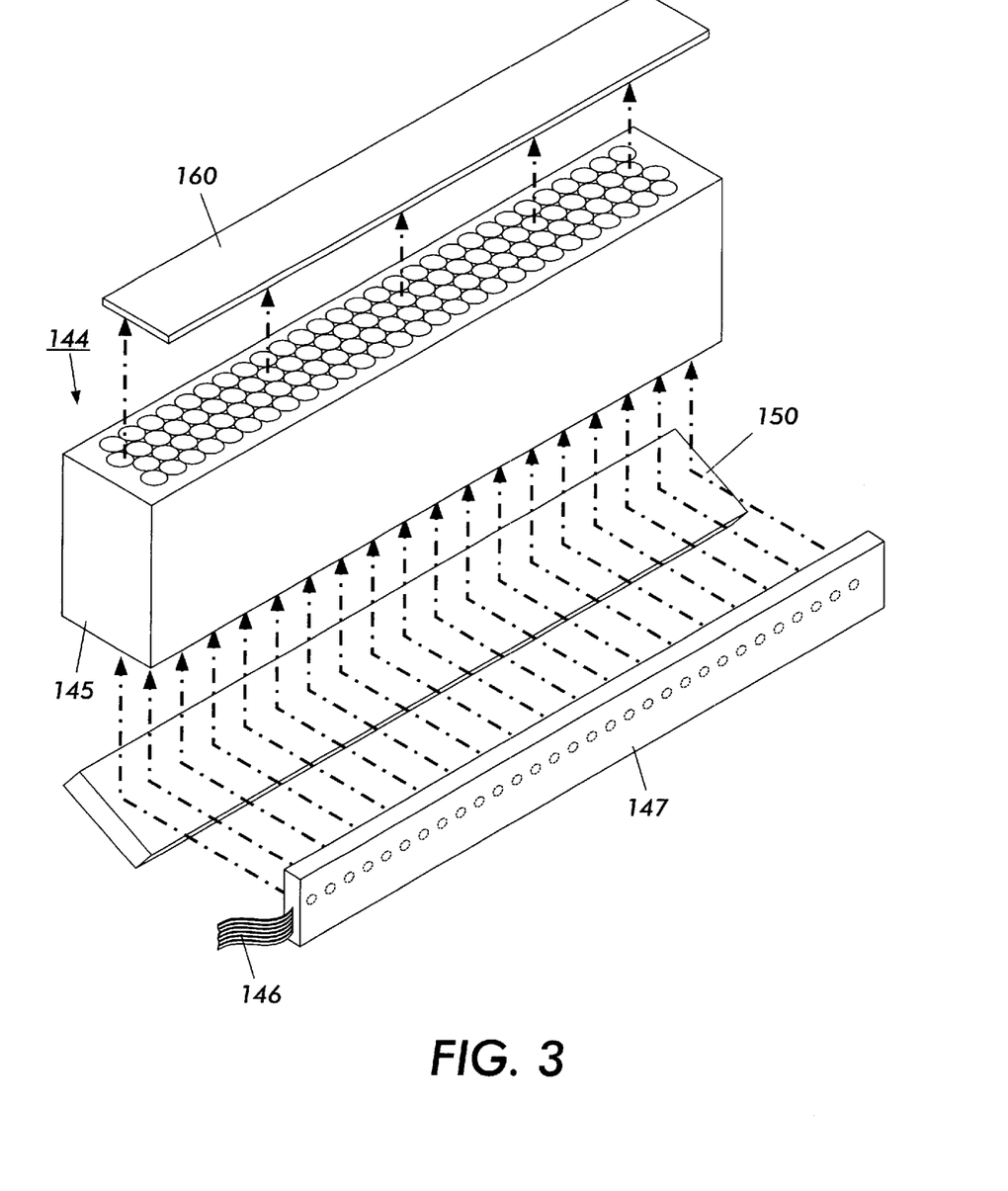
FIG. 3, which schematically illustrates a simplified view of a photodetector array assembly used in the input scanner of FIG. 2.

Turning now to FIG. 3, the photodetector assembly 144 includes input optics 145 having a gradient index lens array, an elongated light sensor array 147, beneficially in the form a photodiode array, and a mirror 150. The input optics 145 has an object plane 160. An original object at the object plane 160 is imaged onto the elongated sensor array 147 along an optical path that includes the mirror 160. Each individual sensor element of the elongated light sensor array converts its received photons into electrons. Then, using electronics that are not shown, but that are well known to those skilled in the applicable arts, those electrons are integrated over a predetermined time and converted into digital signals, with the state of each signal depending upon the charge collected during the integration time. The digital signals are then sent out the harness assembly 146 to the image processing system 12 for subsequent use.

Figure 4:
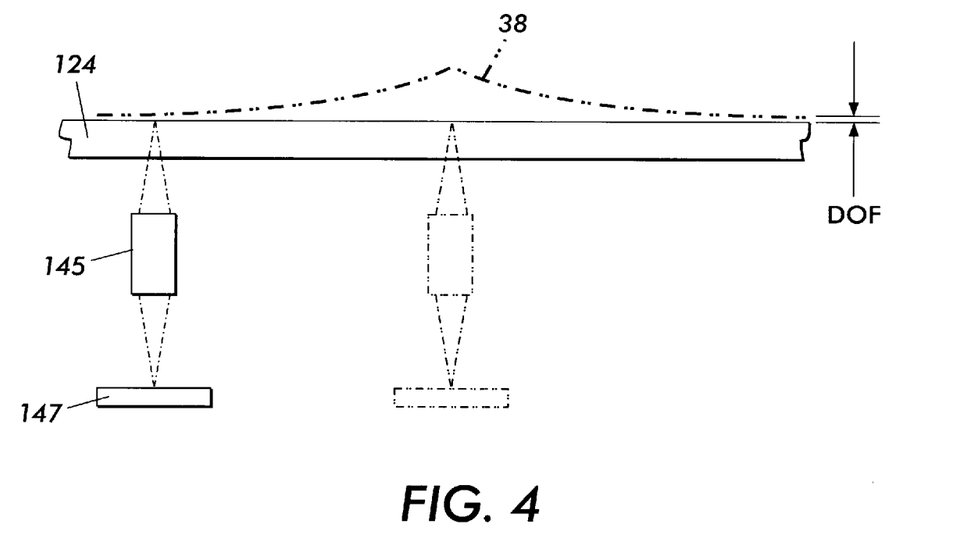
FIG. 4, which illustrates a problem addressed by the present invention, that being the limited depth-of-focus of gradient index lens systems.

One problem when scanning three-dimensional objects on the platen 124 is maintaining the object plane 160 on the surface of the three-dimensional object as the raster scanner moves. FIG. 4 illustrates the problem. With the three-dimensional object aligned with the registration marks 164 (see FIG. 2), when the raster scanner begins scanning the surface of the three-dimensional object might be flat on the platen. The object plane of the input optics 145 might then be on that surface. If so, the elongated light sensor array 147 would then produce digital signals that result in a high quality image. Reference the, solid input optics and elongated light sensor array of FIG. 4. However, at other positions along the platen the surface of the three-dimensional object might lift off of the platen. In that case, unless corrected, the object plane would no longer be on that surface. Reference the phantom input optics 145 and elongated light sensor array 147.

Figure 5:
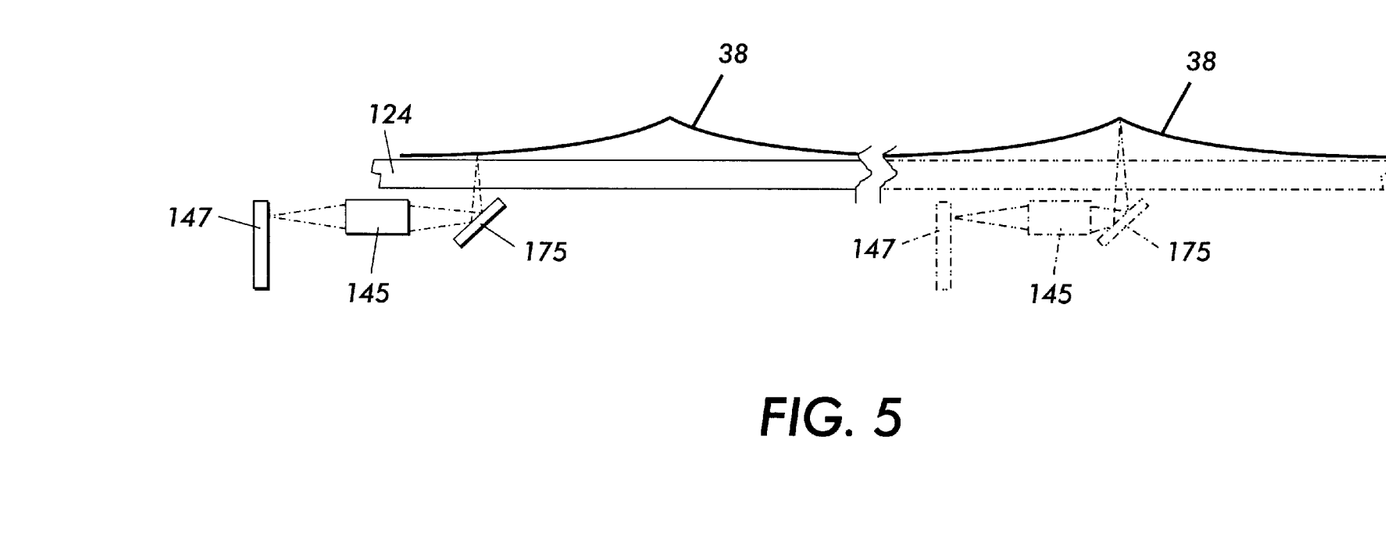
FIG. 5, which illustrates correcting the problem illustrated in FIG. 4 by moving the object plane of a single gradient index lens system so as to track the contour of a three dimensional object on a platen.

A first method of correcting the problem is illustrated in FIG. 5. The photodetector assembly is designed such that a mirror 175 folds the optical path between the object plane and the imaging lens 145. Notice that in FIG. 5 the mirror 175 appears optically before the imaging lens. Furthermore, that mirror is movable relative to the input optics 145 (in a manner that is described subsequently). Where the three-dimensional object 38 is flat on the platen the mirror is positioned such that the object plane is on the top surface flat on the platen 124. Reference the solid input optics and elongated light sensor array of FIG. 5. However, where the three-dimensional object lifts from the platen the mirror 175 is moved closer to the input optics 145 such that the object plane tracks the surface of the three dimensional object, reference the phantom input optics and elongated light sensor array of FIG. 5. Thus, by using a movable mirror 175 the object plane can track the contour of the three-dimensional object 38. Appropriate compensation must be made to account for the lateral motion of the object point in addition to the intended vertical motion.

Figure 6:
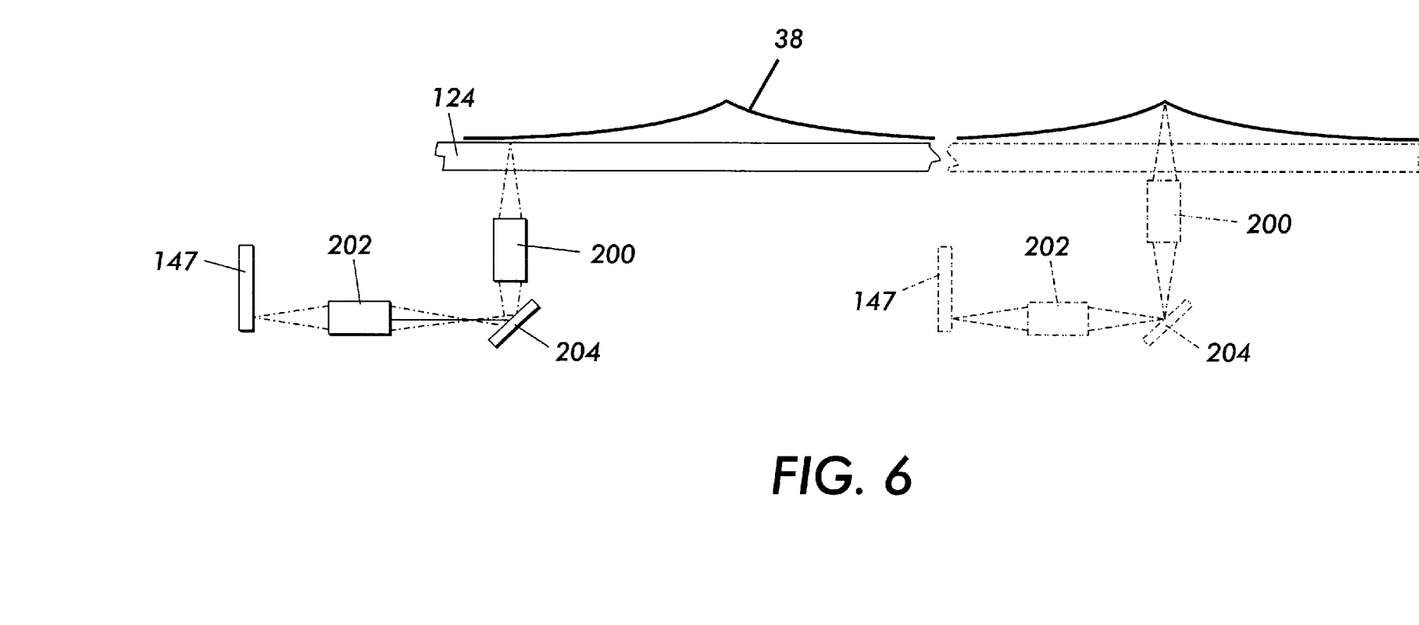
FIG. 6, which illustrates correcting the problem illustrated in FIG. 4 by moving the object plane of a dual gradient index lens system so as to track the contour of a three dimensional object on a platen.

FIG. 6 shows another technique of correcting the problem illustrated in FIG. 4. As shown in FIG. 6, that technique uses an input optical system having two gradient index lens arrays 200 and 202, and a mirror 204 that is disposed between those two arrays. In FIG. 6 the array 202 is spatially fixed relative to the elongated light sensor array 147. However, both the array 200 and the mirror 204 are movable relative to the array 202. Where the three-dimensional object 38 is flat on the platen the array 200 is positioned such that its object plane is on the top surface of the platen 124. This is achieved by positioning the mirror 204 away from the array 202 such that the object plane of the array 202 matches the focal plane of the array 200. However, where the three-dimensional object lifts off the platen the array 200 moves up and the mirror 204 moves toward the array 202. This action keeps the object plane of the array 202 on the focal plane of the array 200. Again, a moving mirror assists retaining the object plane of the raster input scanner on the contour of the three-dimensional object 38. However, the mirror 204 is now located within the optical system of gradient index lens arrays.

Figure 7:
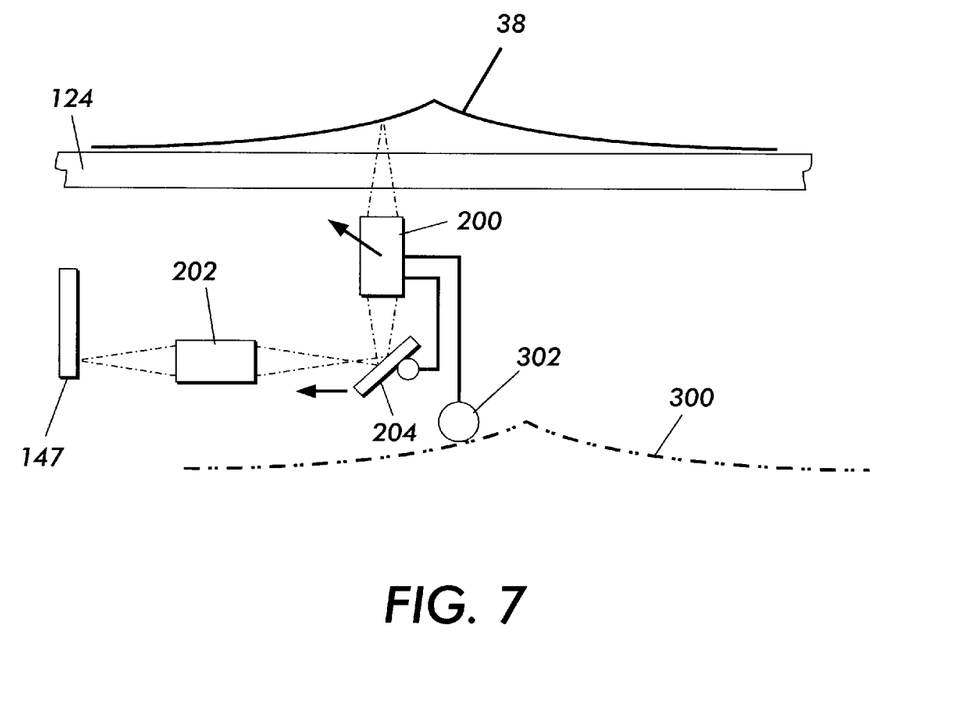
FIG. 7, which illustrates how a tracking mechanism causes the object plane contour to match the contour of a three-dimensional object.

Mirror motion that tracks the contour of the three-dimensional object can be obtained in numerous ways. For example, FIG. 7 shows an optical system similar to that shown in FIG. 6, but with a contoured track guide that mimics the contour of the three-dimensional object 38. As the raster input scanner scans the three-dimensional object a sensor 302 moves across the track guide 300. As the sensor 302 moves vertically, the array 200 and the mirror 204 are positioned such that the object plane of the array 200 remains on the three-dimensional object while the focal plane of the array 202 remains on the elongated light sensor array 147.

Figure 8:
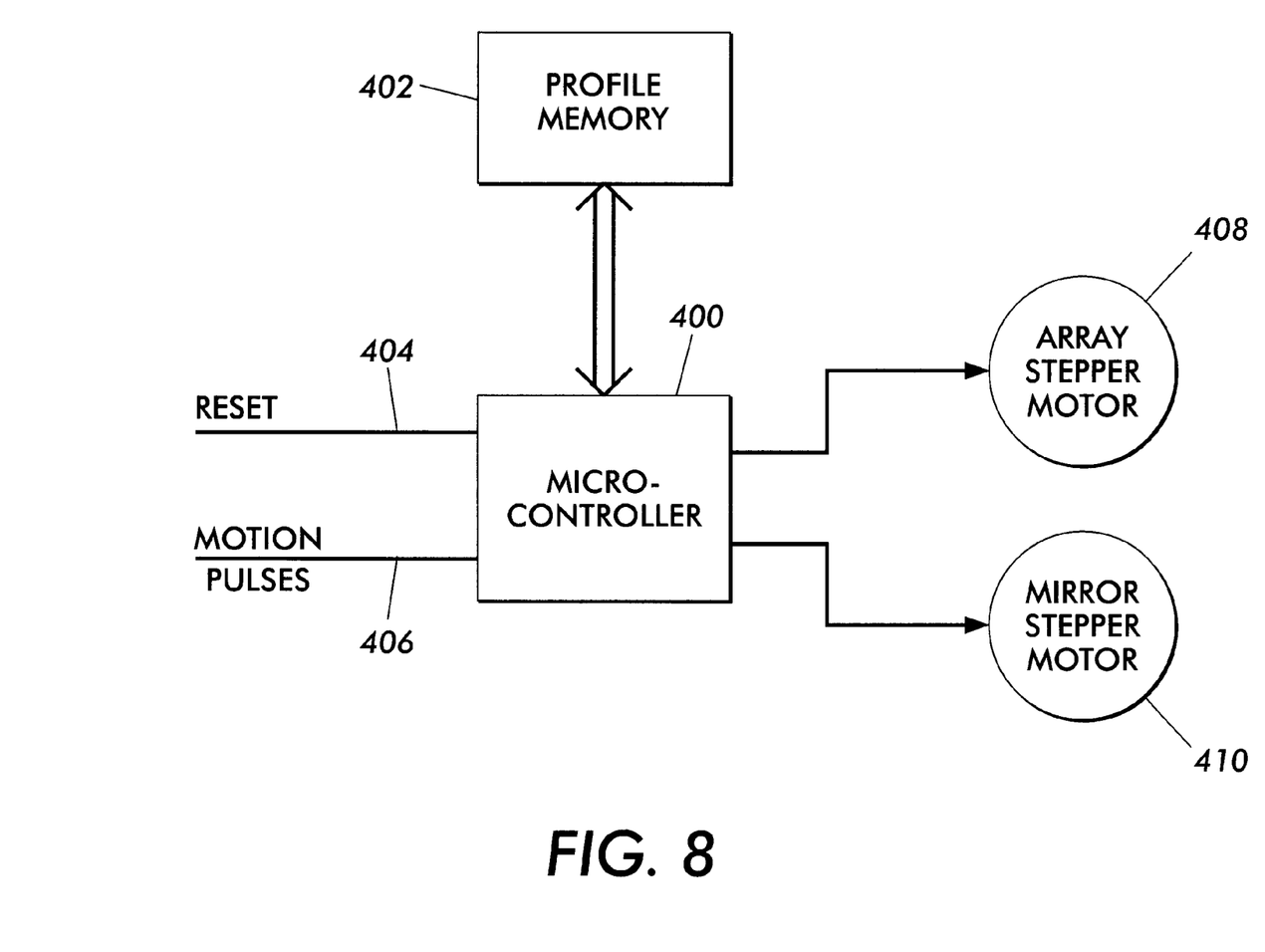
FIG. 8, which illustrates a tracking mechanism having its motor driven in response to contour information stored in a memory.

The track guide 302 could be a mechanical guide positioned below the raster input scanner. In that case, the sensor 302 might be a simple potentiometer. However, the functional features of a mechanical guide can be achieved electronically. For example, FIG. 8 schematically illustrates an electronic version of the mechanical guide. Instead of a sensor that tracks a guide, a microcontroller 400 receives profile information from a profile memory 402. The profile information represents a mapping of the contour (vertical) verses the scan position of the raster input scanner. When a reset signal on a reset line 404 is received by the microcontroller, the microcontroller knows that the raster input scanner is at a start position. As the raster scanner moves, motion pulses are applied to the microcontroller via an input line 406. This enables the microcontroller to track the movement of the raster input scanner. At the same time, the microcontroller can determine from the profile information where the object plane and where the mirror should be. The microcontroller then causes an array stepper motor 408 to properly position the array that controls the object plane and a mirror stepper motor 410 to properly position the mirror.

Figure 9:
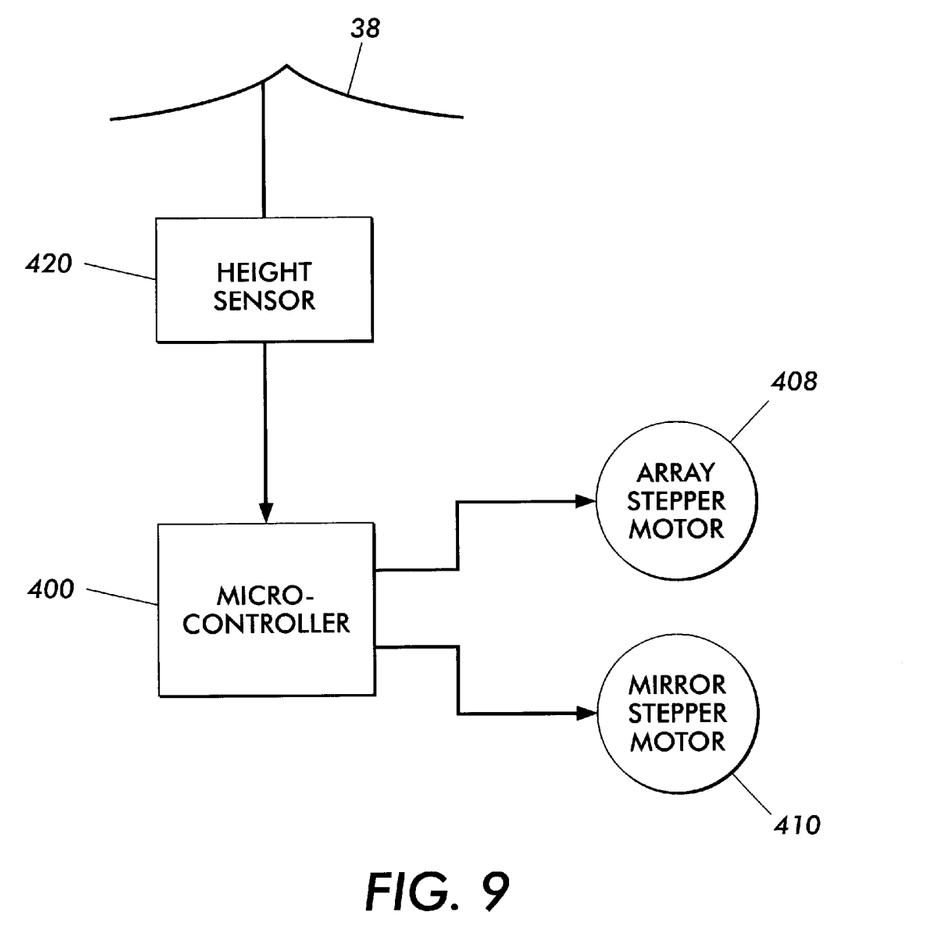
FIG. 9, which illustrates a tracking mechanism having its motor driven in response to contour information from a height sensor.

While the foregoing has described mechanical and electrical positioning of mirrors and arrays according to static contour profiles, it is also possible to use dynamic positioning. Such as a system is illustrated in FIG. 9. As illustrated, a microcontroller 400 causes an array stepper motor and a mirror stepper motor to position optical elements such that an object plane remains on a three-dimensional object 38. However, instead of a mechanical track guide or its electrical equivalent, a height sensor is used to determined the desired object position. That height information is then sent to. the microcontroller 400, which then determines how the stepper motors should move.

While the principles of the present invention are have been described in relation to various embodiments, those embodiments are exemplary only. Furthermore, many essential, but common, elements, such as power supplies, software routines, mechanical couplings, and safety features have not been described. Therefore, others who are. skilled in the applicable arts will recognize numerous modifications and adaptations of the illustrated embodiments that will remain within the principles of the present invention. Therefore, the present invention is to be limited only by the appended claims.

What is claimed is:

1. An input scanner, comprising:
    a platen for holding an object having an image and a contour;
    a raster scanner adjacent said platen, said raster scanner having a light source that emits a line of light through said platen and toward an object plane, an elongated sensor array, and input optics for focusing light from said object plane onto said sensor array, said input optics including a movable mirror that adjusts said object plane relative to said platen, wherein said raster scanner produces a digital representation of the image on the object;
    a motion producer for moving said raster scanner relative to said platen such that said line of light scans across said platen; and
    a positioning system including a contoured crack guide for positioning said mirror such that said object plane tracks the contour of the object as said motion producer moves said raster scanner.

2. The input scanner according to claim 1, wherein the object is an open book and wherein the contour is that of the open book lying on said platen.

3. The input scanner according to claim 1, wherein said positioning system includes a profile memory for storing contour signals, a controller for converting said contour signals into drive signals, and a motor that positions said mirror in response to said drive signals, wherein said contour signals produce drive signals that cause said object plane to track the contour of the object.

4. The input scanner according to claim 1, wherein said positioning system includes a height sensor for producing height signals, a controller for converting said height signals into drive signals, and a motor that positions said mirror in response to said drive signals, wherein said height signals induce drive signals that cause said object plane to track the contour of the object.

5. An input scanner, comprising:
    a platen for holding an object having an image and a contour;
    a raster scanner adjacent said platen, said raster scanner having a light source that emits a line of light through said platen and toward an object plane, an elongated sensor array, and input optics for focusing light from said object plane onto said elongated sensor array, said input optics including a movable mirror, a movable first lens array, and a second lens array that is fixed relative to said elongated sensor array, wherein the positions of said movable mirror and of said movable first lens array control the position of said object plane relative to said platen, wherein the object plane of second lens array is substantially orthogonal to the subject plane of the first lens array, and wherein said raster scanner produces a digital representation of the image on the object;
    a motion producer for moving said raster scanner relative to said platen such that said line of light scans across said platen); and
    a positioning system for positioning said mirror and said first lens array such that said object plane tracks the contour of the object as said motion producer moves said raster scanner.

6. The input scanner according to claim 5, wherein the object is a open book and wherein the contour is that of the book lying on said platen.

7. The input scanner according to claim 5, wherein said positioning system includes a track guide, and wherein said mirror and said first lens array are positioned such that said object plane tracks the contour of the object as said motion producer moves said raster scanner.

8. The input scanner according to claim 5, wherein said positioning system includes a profile memory for storing contour signals, a controller for converting said contour signals into mirror drive signals and into lens drive signals, a mirror motor that positions said mirror in response to said mirror drive signals, and an array motor that positions said first lens array in response to said lens drive signals, wherein said contour signals produce mirror and lens drive signals that cause said object plane to track the contour of the object.

9. The input scanner according to claim 5, wherein said positioning system includes a height sensor for producing height signals, a controller for converting said height signals into mirror drive signals and into lens drive signals, a mirror motor that positions said mirror in response to said mirror drive signals, and an array motor that positions said first lens array in response to said lens drive signals, wherein said height signals induce mirror and lens drive signals that cause said object plane to track the contour of the object.

10. A copier, comprising:
a platen for holding an object having an image and a contour,
an input scanner comprising a moving carriage that holds a light source that emits a line of light through said platen and toward an object plane, an elongated sensor array, input optics for focusing light from said object plane onto said elongated sensor array, said input optics including a movable mirror that adjusts said object plane relative to said platen, said input scanner farther including a positioning system including a contoured track guide for positioning said mirror in response to mirror position signals, wherein said raster scanner produces a digital representation of the image on the object;
a motion producer for moving said raster scanner such that said line of light scans across said platen; and
a controller having a user interface that selectively selects three-dimensional copying, said controller for producing, in response to the selection of three-dimensional copying, mirror position signals that cause said positioning system to position said mirror such that said object plane tracks the contour of the object as said motion producer moves said line of light; said controller further for receiving said digital representation of the image at the object plane and for producing video signals that represent an image to be copier; and
a printer for printing the image represented by said video signals.

11. A copier according to claim 10, wherein the three-dimensional object is a book.

12. A copier according to claim 1, wherein said copier is an electrophotographic copier.

13. A copier according to claim 12, wherein said printer is a color printer.

14. The copier according to claim 10, wherein said positioning system includes a mirror that positions said mirror such that object plane tracts the contour of the object.

15. The copier according to claim 10, wherein said controller includes a profile memory for storing contour signals and a subcontroller for converting said contour signals into said mirror position signals, wherein said positioning system includes a mirror motor that positions said mirror in response to said mirror position signals, and wherein said mirror position signals cause said object plane to track the contour of the object.

16. The copier according to claim 15, wherein said input optics further includes a movable lens array that adjusts the position of said object plane relative to said platen, wherein said positioning system further includes a lens motor that positions said movable lens array in response to lens drive signals, wherein said subcontroller further converts said contour signals into said lens drive signals, and wherein said lens drive signals cause said object plane to track the contour of the object.

17. The copier according to claim 10, wherein said controller includes a height sensor for producing height signals and a subcontroller for converting said height signals into mirror drive signals, wherein said positioning system includes a mirror motor that positions said mirror in response to said mirror drive signals, and wherein said mirror drive signals cause said object plane to track the contour of the object.

18. The copier according to claim 17, wherein said input optics further includes a movable lens array that adjusts the position of said object plane relative to said platen, wherein said positioning system further include a lens motor that positions said movable lens array in response to lens drive signals, wherein said subcontroller further converts said height signals into said lens drive signals, and wherein said lens drive signals cause said object plane to track the contour of the object.

* * * * *